(12) United States Patent
Van Phan et al.

(10) Patent No.: US 9,584,951 B2
(45) Date of Patent: Feb. 28, 2017

(54) MODE SWITCHING (75) Inventors: Vinh Van Phan, Oulu (FI); Sami Hakola, Kempele (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 719 days.

(21) Appl. No.: 13/993,535

(22) PCT Filed: Dec. 14, 2010

(86) PCT No.: PCT/EP2010/069653
§ 371 (c)(1),
(2), (4) Date: Jun. 12, 2013

(87) PCT Pub. No.: WO2012/079621
PCT Pub. Date: Jun. 21, 2012

(65) Prior Publication Data
US 2013/0265974 A1 Oct. 10, 2013

(51) Int. Cl.
*H04W 76/02* (2009.01)
*H04W 4/00* (2009.01)
*H04W 36/02* (2009.01)

(52) U.S. Cl.
CPC ............ *H04W 4/005* (2013.01); *H04W 36/02* (2013.01); *H04W 76/023* (2013.01)

(58) Field of Classification Search
None
See application file for complete search history.

(56) References Cited

U.S. PATENT DOCUMENTS

| 2001/0017850 | A1* | 8/2001 | Kalliokulju et al. | 370/331 |
| 2008/0310367 | A1* | 12/2008 | Meylan | 370/331 |
| 2009/0046662 | A1* | 2/2009 | Casati et al. | 370/331 |
| 2009/0046683 | A1* | 2/2009 | Jung et al. | 370/338 |
| 2009/0264128 | A1* | 10/2009 | Tomisawa | H04W 36/30 455/436 |
| 2010/0009675 | A1* | 1/2010 | Wijting et al. | 455/426.1 |
| 2010/0279672 | A1 | 11/2010 | Kosekela et al. | |

OTHER PUBLICATIONS

International Search Report received for corresponding Patent Cooperation Treaty Application No. PCT/EP2010/069653, dated Aug. 17, 2011, 5 pages.

* cited by examiner

*Primary Examiner* — Alex Skripnikov
(74) *Attorney, Agent, or Firm* — Mintz Levin Cohn Ferris Glovsky and Popeo, P.C.

(57) ABSTRACT

The invention relates to apparatuses, a method, computer programs and computer-readable media for controlling mode change from a normal cellular communication mode to a machine-to-machine or device-to-device communication mode and to ensure sequence number synchronization between a sender and receiver ends when said mode change is performed. The mode change control is performed by controlling the duration of the transition period for switching from the cellular communication mode to the machine-to-machine or device-to-device mode and by using a temporary server for transmission of a desired data flow or by sending at least one dummy packet.

17 Claims, 5 Drawing Sheets

MODE SWITCHING

RELATED APPLICATION

This application was originally filed as PCT Application No. PCT/EP10/069653 filed Dec. 14, 2010.

FIELD

The invention relates to apparatuses, methods, computer programs, computer program products and computer-readable media.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Third Generation Partnership Project (3GPP) Long Term Evolution (LTE) and Long term Evolution advanced (LTE-A) programs are to develop technology in order to provide improved spectral efficiency, reduced latency, and more efficient use of radio resources for improved user experiences and faster data transmission. As a part of these efforts, the concept of an in-home, (evolved) node B (called Home (e)NB) for LTE and LTE-Advanced networks has been introduced.

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: at least one processor and at least one memory including a computer program code, the at least one memory and the computer program code configured to, with the at least one processor, cause the apparatus at least to: control duration of a transition period for switching to a machine-to-machine communication mode, and control synchronization of data flows during the transition period, or control stopping of sending data and sending of at least one dummy packet, the at least one dummy packet being used for controlling a progress of the switching to the machine-to-machine communication, and prepare configuration of end-user devices of data sending and receiving sides for switching to the machine-to-machine communication mode.

According to another aspect of the present invention, there is provided an apparatus comprising: at least one processor and at least one memory including a computer program code, the at least one memory and the computer program code configured to, with the at least one processor, cause the apparatus at least to: stop sending data, and generate at least one dummy packet and initiate sending of the at least one dummy packet for controlling the progress of starting a transition period for switching to a machine-to-machine communication mode.

According to yet another aspect of the present invention, there is provided an apparatus comprising: at least one processor and at least one memory including a computer program code, the at least one memory and the computer program code configured to, with the at least one processor, cause the apparatus at least to: in the case of a plurality of data flows being mapped or multiplexed on a bearer, extract a desired data flow from the bearer; map the desired data flow on a temporary bearer for transmission, and add control information to the temporary bearer for transmission during a transition period for switching to a machine-to-machine communication mode; or in the case of at least one dummy packet is being used for controlling a progress of marking a beginning of the transition period for switching to a machine-to-machine communication mode, terminate conveyance of the at least one dummy packet by reporting receiving of the at least one dummy packet.

According to yet another aspect of the present invention, there is provided a method comprising: controlling duration of a transition period for switching to a machine-to-machine communication mode, and controlling synchronization of data flows during the transition period, or controlling stopping of sending data and sending of at least one dummy packet, the at least one dummy packet being used for controlling a progress of the switching to the machine-to-machine communication mode, and preparing configuration of end-user devices of data sending and receiving sides for switching to the machine-to-machine communication mode.

According to yet another aspect of the present invention, there is provided a method comprising: stopping sending data, and generating at least one dummy packet and initiating sending of the at least one dummy packet for controlling the progress of switching to a machine-to-machine communication mode.

According to yet another aspect of the present invention, there is provided a method comprising: in the case of a plurality of data flows being mapped or multiplexed on a bearer: extracting a desired data flow from the bearer; mapping the desired data flow on a temporary bearer for transmission, and adding control information to the temporary bearer for transmission during a transition period for switching to a machine-to-machine communication mode; or in the case of at least one dummy packet is being used for controlling a progress of switching to a machine-to-machine communication mode: terminating conveyance of the at least one dummy packet by reporting receiving of the at least one dummy packet.

According to yet another aspect of the present invention, there is provided an apparatus comprising: means for controlling duration of a transition period for switching to a machine-to-machine communication mode, and means for controlling synchronization of data flows during the transition period, and/or means for controlling stopping of sending data and sending of at least one dummy packet, the at least one dummy packet being used for controlling a progress of the switching to the machine-to-machine communication mode, and means for preparing configuration of end-user devices of data sending and receiving sides for switching to the machine-to-machine communication mode.

According to yet another aspect of the present invention, there is provided an apparatus comprising: means for stopping sending data, and means for generating at least one dummy packet and initiate sending of the at least one dummy packet for controlling the progress of switching to a machine-to-machine communication mode.

According to yet another aspect of the present invention, there is provided an apparatus comprising: means for extracting a desired data flow from the bearer; means for mapping the desired data flow on a temporary bearer for transmission, and means for adding control information to the temporary bearer for transmission during a transition period for switching to a machine-to-machine communication mode, in the case of a plurality of data flows being mapped or multiplexed on a bearer; and/or means for terminating conveyance of the at least one dummy packet by reporting receiving of the at least one dummy packet, in the case of at least one dummy packet is being used for controlling a progress of switching to a machine-to-machine communication mode.

According to yet another aspect of the present invention, there is provided computer program embodied on a computer-readable storage medium, the computer program comprising program code for controlling a process to execute a process, the process comprising: controlling duration of a transition period for switching to a machine-to-machine communication mode, and controlling synchronization of data flows during the transition period, or controlling stopping of sending data and sending of at least one dummy packet, the at least one dummy packet being used for controlling a progress of the switching to the machine-to-machine communication mode, and preparing configuration of end-user devices of data sending and receiving sides for switching to the machine-to-machine communication mode.

According to yet another aspect of the present invention, there is provided computer program embodied on a computer-readable storage medium, the computer program comprising program code for controlling a process to execute a process, the process comprising: stopping sending data, and generating at least one dummy packet and initiating sending of the at least one dummy packet for controlling the progress of switching to a machine-to-machine communication mode.

According to yet another aspect of the present invention, there is provided computer program embodied on a computer-readable storage medium, the computer program comprising program code for controlling a process to execute a process, the process comprising: in the case of a plurality of data flows being mapped or multiplexed on a bearer: extracting a desired data flow from the bearer; mapping the desired data flow on a temporary bearer for transmission, and adding control information to the temporary bearer for transmission during a transition period for switching to a machine-to-machine communication mode; or in the case of at least one dummy packet is being used for controlling a progress of switching to a machine-to-machine communication mode: terminating conveyance of the at least one dummy packet by reporting receiving of the at least one dummy packet.

LIST OF DRAWINGS

Embodiments of the present invention are described below, by way of example only, with reference to the accompanying drawings, in which.

DESCRIPTION OF EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user device, such as a user terminal, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different embodiments will be described using, as an example of an access architecture to which the embodiments may be applied, a radio access architecture based on LTE-Advanced, LTE-A, that is based on orthogonal frequency multiplexed access (OFDMA) in a downlink and a single-carrier frequency-division multiple access (SC-FDMA) in an uplink, without restricting the embodiments to such an architecture, however.

In an orthogonal frequency division multiplexing (OFDM) system, the available spectrum is divided into multiple orthogonal sub-carriers. In OFDM systems, available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease Inter-Symbol Interference. Unlike in OFDM, SC-FDMA subcarriers are not independently modulated.

Typically, a (e)NodeB needs to know channel quality of each user device and/or the preferred precoding matrices (and/or other multiple input-multiple output (MIMO) specific feedback information, such as channel quantization) over the allocated sub-bands to schedule transmissions to user devices. Required information is usually signalled to the (e)NodeB.

Figure 1:
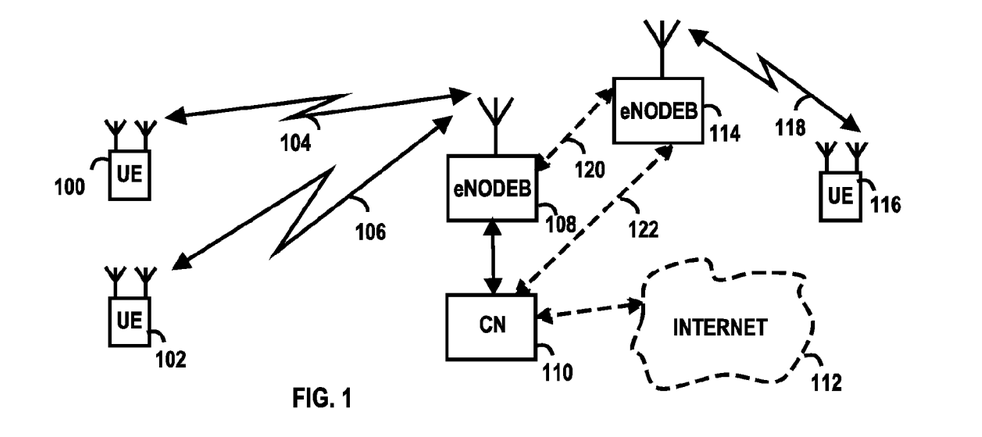
FIG. 1 illustrates an example of a system.

FIG. 1 is an example of a simplified system architecture only showing some elements and functional entities, all being logical units whose implementation may differ from what is shown. The connections shown in FIG. 1 are logical connections; the actual physical connections may be different. It is apparent to a person skilled in the art that the system typically comprises also other functions and structures than those shown in FIG. 1.

FIG. 1 shows a part of a radio access network of E-UTRA, LTE or LTE-Advanced (LTE-A). E-UTRA is an air interface of Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

The embodiments are not, however, restricted to the system given as an example but a person skilled in the art may apply the solution to other communication systems provided with the necessary properties. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), wideband code division multiple access (WCDMA) and systems using ultra-wideband (UWB) technology.

FIG. 1 shows user devices 100 and 102 configured to be in a wireless connection on one or more communication channels 104, 106 in a cell with a (e)NodeB 108 providing the cell. The cell may be any kind of a radio cell. The physical link from a user device to a (e)NodeB is called uplink or reverse link and the physical link from the NodeB to the user device is called downlink or forward link.

Node (e)NodeB 114 may be a Home(e)Node or pico or femto node, but it may provide any kind of a radio cell. It may be operably coupled 120 to the (e)NodeB 108 which may provide a macro cell or a primary communication system cell. User device 116 depicts a user device communicating with the (e)NodeB via a radio link 118. The (e)NodeB may be coupled to the core network 110 directly (arrow 122) or indirectly via another network node (arrow 120).

The NodeB, or advanced evolved node B (eNodeB, eNB) in LTE-Advanced, is a computing device configured to control the radio resources of communication system it is coupled to. The (e)NodeB may also be referred to a base station, an access point or any other type of interfacing device including a relay station capable of operating in a wireless environment.

The (e)NodeB includes transceivers, for instance. From the transceivers of the (e)NodeB, a connection is provided to an antenna unit that establishes bidirectional radio links to user devices. The (e)NodeB is further connected to a core network 110 (CN). Depending on the system, the counterpart on the CN side may be a serving system architecture evolution (SAE) gateway (routing and forwarding user data packets), packet data network gateway (PDN GW), for providing connectivity to user devices (UEs) to external packet data networks, or mobile management entity (MME), etc.

The communication system is also able to communicate with other networks, such as a public switched telephone network or the Internet.

The user device (also called UE, user equipment, user terminal, etc.) illustrates one type of an apparatus to which resources on the air interface may be allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, laptop computer, game console, notebook, and multimedia device.

The user device (or a layer 3 relay node) is configured to perform one or more of user equipment functionalities described herein, and it may be configured to perform functionalities from different embodiments. The user device may also be called a subscriber unit, mobile station, remote terminal, access terminal, user terminal or user equipment (UE) just to mention but a few names or apparatuses.

It should be understood that, in the FIG. 1, user devices are depicted to include 2 antennas only for the sake of clarity. The number of reception and/or trans-mission antennas may naturally vary according to a current implementation.

Further, although the apparatuses have been depicted as single entities, different units, processors and/or memory units (not all shown in FIG. 1) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometres, or smaller cells such as micro-, femto- or picocells. The (e)NodeBs 108 and 114 of FIG. 1 may provide any kind of these cells. A cellular radio system may be implemented as a multilayer network including several kinds of cells. Typically, in multilayer networks, one node B provides one kind of a cell or cells, and thus a plurality of node Bs are required to provide such a network structure. Recently for fulfilling the need for improving the deployment and performance of communication systems, concept of "plug-and-play" node (e)Bs has been introduced. Typically, a network which is able to use "plug-and-play" node (e)Bs, includes, in addition to Home node (e)Bs (Home(e)nodeBs), a home node B gateway, or HNB-GW (not shown in FIG. 1). A HNB Gateway (HNB-GW), which is typically installed within an operator's network aggregates traffic from a large number of HNBs back to a core network through Iu-cs and Iu-ps interfaces.

Term "plug-and-play" is used herein to describe an apparatus which can be coupled to a network with a minimum configuration work, typically such an apparatus is a self-configuring device. For enabling "plug-and-play" devices a self-organizing network (SON) and flexible spectrum use (FSU) concepts have been launched. The SON concept is for instance known in connection to computer networks and neural networks. The FSU enables devices to use spectrum in a flexible manner. In future networks, more frequency bands will most probably be needed for new high-bit-rate wireless services.

A home node (e)B (sometimes being comparable to a femto or pico node) when coupled to broadband services providing an umbrella cell provides radio coverage for user devices. H(e)NBs may provide the capabilities of a standard node B as well as the radio resource management functions of a standard radio network controller (RNC).

A HN(e)B when serving as a "plug-and-play" node B may be a wireless access point purchased, installed and operated by a private user, a single user or a community, such as a university or a shopping centre.

A home node B may be used in a local area network (LAN) which is a computer network covering a relatively small geographical area, such as a home or office. Similar kinds of networks are personal area networks (PANs), campus area networks (CANs), or metropolitan area networks (MANS). Another network system where HNBs are typically used is a Wide Area Network (WAN) which is a network covering a relatively broad area. A WAN may be defined to be a network whose coverage crosses metropolitan, regional, or national boundaries. Probably the best-known example is the Internet.

An example of a network system is also a mixed Local Area/Wide Area (LA/WA) scenario in which several cellular networks of the same radio access technology (e.g.

E-UTRA) being operated by different operators are deployed in the same geographical area, such as a modern home-and-office building complex, and are using the same radio spectrum resources.

The mixed LA/WA scenarios may for instance refer to hierarchical cell structures, such as to a LTE/LTE or LTE/LTE-A co-existence or hot spots with overlay network. Within LA/WA coverage, H(e)NBs or local node Bs (LNBs) of the same or different networks may be placed and set up next to each other in a short distance in a spatially uncoordinated fashion.

The integration of new network topologies into a cellular network rouses more and more attraction and interest both in industry and in the academics of telecommunications. One example of such a possible evolution is the inclusion of new wireless nodes often called machines. This typically requires enabling local communication directly among these machines under the control of a network or in an autonomous fashion. Machine-to-machine (M2M) or device-to-device (D2D) refers to technologies that allow systems to communicate with other devices of the same or corresponding ability.

A communication network may also be a so-called heterogeneous network that is a network designed for both machine-to-machine (or device-to-device) and "normal" cellular communications that is also called equipment-to-equipment communication. A heterogeneous network may provide following functionalities: device-to-device or machine-to-machine communication, cluster-wise communication, grid of local machines communicating with each other performing certain tasks, advanced device acting as a gateway for a bunch of low-capability devices or machines to access the network and/or secondary usage of cellular system spectrum, etc. The heterogeneous local communication may include network controlled device-to-device (D2D) or machine-to-machine (M2M) communication including communication in one or more clusters of devices or machines, (semi-) autonomous D2D or M2M communication in a cellular network, grid or group of local machines communicating with each other while performing some tasks in cooperative manner, advanced cellular device acting as gateway for a bunch of low-capability devices or machines to access the network and a co-operative downloading or multicasting within a cluster of devices or machines.

Devices capable of machine-to-machine communication may be used for many purposes, such as smart homes, smart metering, fleet management, remote healthcare and access network operation management.

In switching from cellular (equipment-to-equipment, E2E) mode to D2D or M2M mode, it is expected that a notable gain in either quality-of-service (QoS) or overall network performance is obtainable. An E2E interactive data service, such as sharing files on-line, may possibly not tolerate data losses at all, whereas other realtime E2E service, such as voice or video calls, may tolerate losses to some extent. Thus E2E content synchronization for continuity of service is typically required. This may depend on ongoing service applications, QoS requirements and protocol stacks applied for the D2D or M2M mode. It is assumed that protocol stacks of D2D or M2M are based on the radio interface of LTE-A cellular-access networks. For this reason, it is expected that packet data convergence protocol (PDCP) which is responsible for radio data ciphering and header compression in E-UTRAN is also used in D2D or M2M. However, PDCP of a D2D or M2M radio link probably operates as an E2E radio link as well. Thus sequence number (SN) synchronization between a sender and receiver ends need to be ensured.

Some embodiments propose methods for received-sent data synchronization between sender and receiver devices while switching to D2D or M2M mode.

Figure 2:
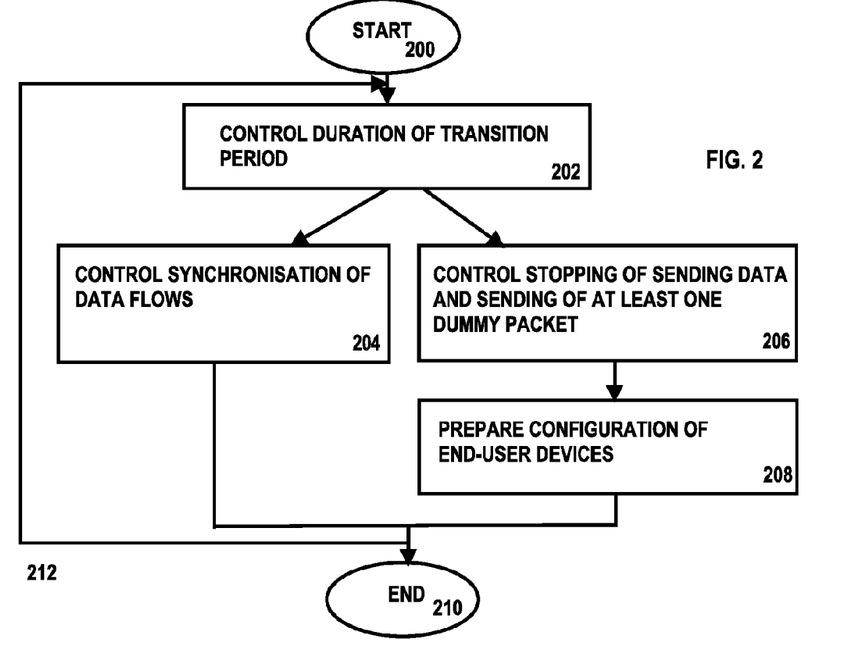
FIG. 2 is a flow chart.
Figure 3:
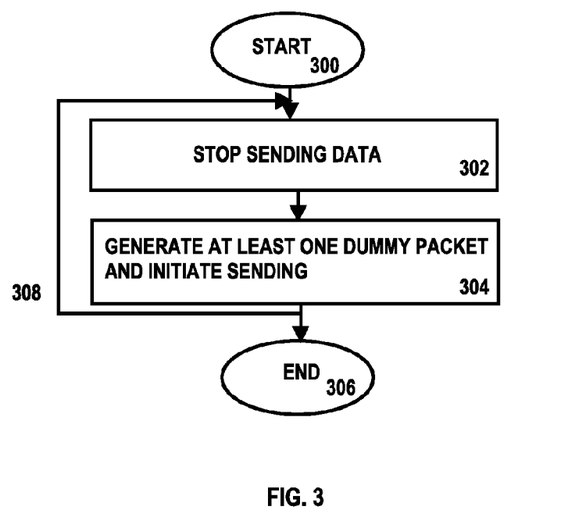
FIG. 3 is another flow chart.
Figure 4:
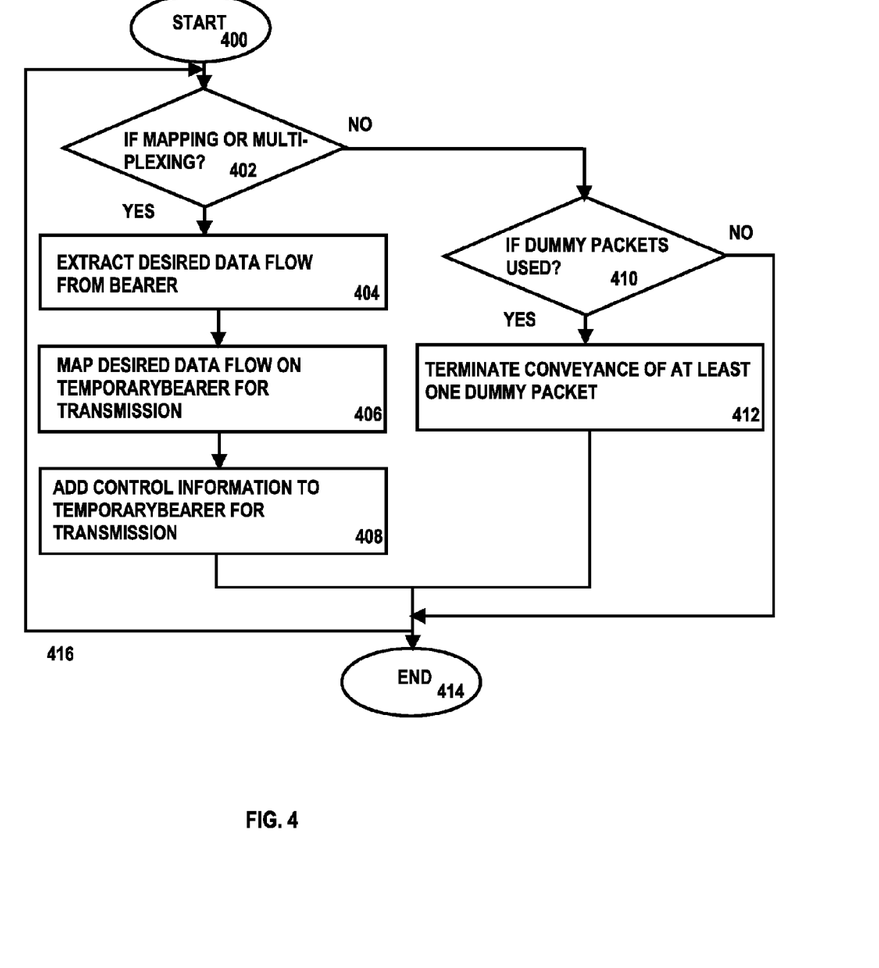
FIG. 4 is yet another flow char.

In the following, some embodiments of network controlling are explained in further detail by means of FIGS. 2, 3 and 4. They provide options for controlling mode change from a normal cellular communications (E2E) to machine-to-machine (M2M) or device-to-device (D2D) communications in a network.

One embodiment starts in block 200. This embodiment is especially suitable to be carried out by a network control device.

In block 202, duration of a transition period for switching to a machine-to-machine communication mode is controlled. One possibility to carry out timing control is that a control unit, such as a DRSF/MME (DRSF=D2D registration server function, MME=mobility management entity) which is in charge of the setup of D2D communication mode, starts a transition period timer for a mode switch from cellular to D2D.

DRSF refers to a proposed network control entity which may be distributed into a mobile management entity or other network control server, node or host or even to a third party server, node or host. In general, DRSF may provide coordinating, controlling functions and/or services for cellular radio systems or (e)NodeBs in setting up cellularly controlled device-to-device or machine-to-machine communications of user devices. DRSF is especially suitable in context of device-to-device or machine-to-machine communications between devices in networks operated by different operators.

In block 204, synchronization of data flows during the transition period is controlled. Data flows may be different kinds of data flows, one example is Internet Protocol (IP) data flows.

The synchronization is needed for a data source device and data target device changing the operation mode in such a way that no data is lost. Some operations which may need synchronisation are a data source device of a data flow stops transmitting the data flow in a cellular radio bearer and a data target device terminates receiving a data flow in that radio bearer. These may be controlled by using a transition period timer.

Another possibility is to use at least one dummy or empty packet for controlling the operation or communication mode change. Thus, in block 206, stopping of sending data and sending of at least one dummy or empty packet is controlled. The at least one dummy or empty packet may be used for controlling the progress of the switching to the machine-to-machine or device-to-device communication mode. In this regard, these dummy or empty packets may be used to find out whether the mode change operation is carried out before the transition period timer expires.

Upon starting a preparation for a D2D or M2M mode switching of an E2E cellular service, the control node may request a serving node of the data source device to stop sending packets for the cellular service in question, generate at least one predefined dummy or empty packet, and send it to the other end typically after transmitting last ongoing buffered packets of the service. The content and/or form of at least one dummy or empty packet are usually predetermined for devices involved being able to distinguish the at lest one dummy or empty packet.

In this option, the role of a transition period timer is to provide reasonable time duration for a data target device to receive packets sent before the at least one dummy or empty packet and the at least one dummy or empty packet itself from the network, but also to take care that the preparation time for the mode switching will not be too long.

The control node may also request a data source device and/or data target device to start a same or corresponding timer.

The serving node of a data target device may terminate the sending of the at least one dummy or empty packet by upon receiving the at least one dummy or empty packer, by reporting it to the control node.

Otherwise, that is if the transition period timer expires and no report is received from the data target device, post-D2D or M2M data synchronization may be invoked between end-user devices after switching to a D2D or M2M communication mode. This may include upper-layer sent-received data synchronization between devices over a D2D or M2M link. This may be implemented by using explicit PDCP control protocol data unit (C-PDU) messages on a user-plane or as a control plane procedure designed for this purpose. One example of such a procedure is a D2D or M2M radio resource control (RRC) protocol.

Normal cellular data transmission may continue with possible retransmissions of some data packets, if necessary due to requirements for obtaining a desired quality of service.

In another option, the data source device may continue the ongoing session right away from the sequence next in the line to be transmitted, if possible data losses are tolerable.

It is also possible that a target device of a PDCP in D2D or M2M operation or communication mode may misinterpret sequence numbers (SNs) of D2D or M2M packets, in the case a new PDCP PDU sequence number obtained from last transmitted data packet SN (+1) is not within a current reordering window. To avoid that, after switching to a device-to-device or machine-to-machine communication mode, the first data packet may comprise information that it is the first data packet after the transmission via a cellular bearer has been terminated. This may be carried out by conveying an (explicit) PDCP message from a data source PDCP entity via a D2D or M2M link. A PDCP control-PDU (C-PDU) transmitted via a D2D or M2M link may contain a first PDU SN after transmission via a cellular bearer has been terminated. This prevents or at least diminishes receiving PDCP entity to misinterpret sequence numbers. A new C-PDU message type may be specified to convey this information. After the reception of the last transmitted packet via a cellular bearer, the data target device may reset a PDCP sequence number window to match a sequence number in a new control PDU. The data target device may respond by reporting the first missing PDCP PDU. This indicates a transmitting entity that it may transmit data via a D2D or M2M link.

In block 208, configuration of end-user devices of data source and target sides are prepared for switching to the machine-to-machine communication mode.

The serving node of the data target device may terminate the sending of the at least one dummy or empty packet by upon receiving the at least one dummy or empty packet, and report the successful reception to the control node. The control node may thus on the basis of receiving the report within the transition period, configure end-user devices of the data source and data target sides. The synchronization may be based on a packet data convergence protocol (PDCP) sequence number (SN) based on the current SN of the data source device.

Configuration of a device may mean modifications made for devices being able to communicate with each other and/or the network. The modifications are typically carrier our by using software.

The embodiment ends in block 210. The embodiment is repeatable and one option for repetition is shown with arrow 212. The arrow shows the option when the whole "loop" is repeated. Other options are naturally possible for the user device group definition as explained above.

Another embodiment starts is block 300. This embodiment is especially suitable to be carried out by a serving node of a data source device.

In block 302, data sending is stopped. That means for instance that a data source device of the data flow in question stops transmitting the data flow in a cellular radio bearer.

In block 304, at least one dummy packet for starting a transition period for switching to a machine-to-machine or device-to-device communication mode is generated and its sending is initiated. Dummy or empty packets are explained in further detail above.

The embodiment ends in block 306. The embodiment is repeatable and one option for repetition is shown with arrow 308. The arrow shows the option when the whole "loop" is repeated. Other options are naturally possible for the user device group definition as explained above.

Yet another embodiment starts in block 400. This embodiment is especially suitable to be carried out in a serving node of a data target device.

In the case of a plurality of data flows are mapped or multiplexed on a bearer (block 402), a desired data flow is extracted from the bearer (block 404) and the desired data flow is mapped on a temporary bearer for transmission (block 406).

In the case the data flows of interest are mapped or multiplexed in a radio bearer with other data flows which are not supposed to be moved to D2D or M2M mode, the serving node of a data target device may set up a temporary radio bearer between it and the data target device. The serving node may also extract the desired data of a data flow and map the extracted data on a temporary radio bearer to be transmitted to the data target device. A data source device stops transmitting the data flow in question on a cellular radio bearer.

Naturally, a need to setup a temporary bearer and extract a certain data flow off a bearer does not exists, if no other data flows mapped onto a bearer that carries the data flow to be transferred into a D2D or M2M communication or operation mode are provided.

In block 408, control information is added to the temporary bearer for transmission during a transition period for switching to a machine-to-machine or device-to-device mode. For instance, a serving node of the data target device may modify a PDCP sequence number to correspond with modulo 4096 (12 bit) or 128 (7 bit), depending on the PDCP sequence number size, of the data identification field (16 bit sequence number of Internet protocol (IP)). For the first PDCP PDU sent on the temporary radio bearer and with a modified sequence number, the serving node of the data target device may add a control field to indicate the data target device the modified sequence number.

Upon a transition period timer timeout or reception of D2D or M2M mode activation before the timeout, the serving node of a data target device terminates the temporary bearer or the current individual bearer of the data flow.

Or, in the case of at least one dummy packet being used for controlling the progress of switching to a machine-to-machine or device-to-device communication mode (block 410), conveyance of the at least one dummy packet is terminated by reporting receiving of the at least one dummy packet (block 412). The serving node of the data target device may terminate the dummy transaction by filtering out at least one dummy packet, and upon receiving that dummy packet, by conveying a report to a network control device.

The embodiment ends in block 414. The embodiment is repeatable and one option for repetition is shown with arrow 416. The arrow shows the option when the whole "loop" is repeated. Other options are naturally possible for the user device group definition as explained above.

It should be appreciated that the serving node of a data source device and the serving node of a data target device may be same apparatuses or different apparatuses depending on the topology of a current network. A control node may be located in a serving node or in some other network element, or it may be a standalone apparatus.

Figure 5:
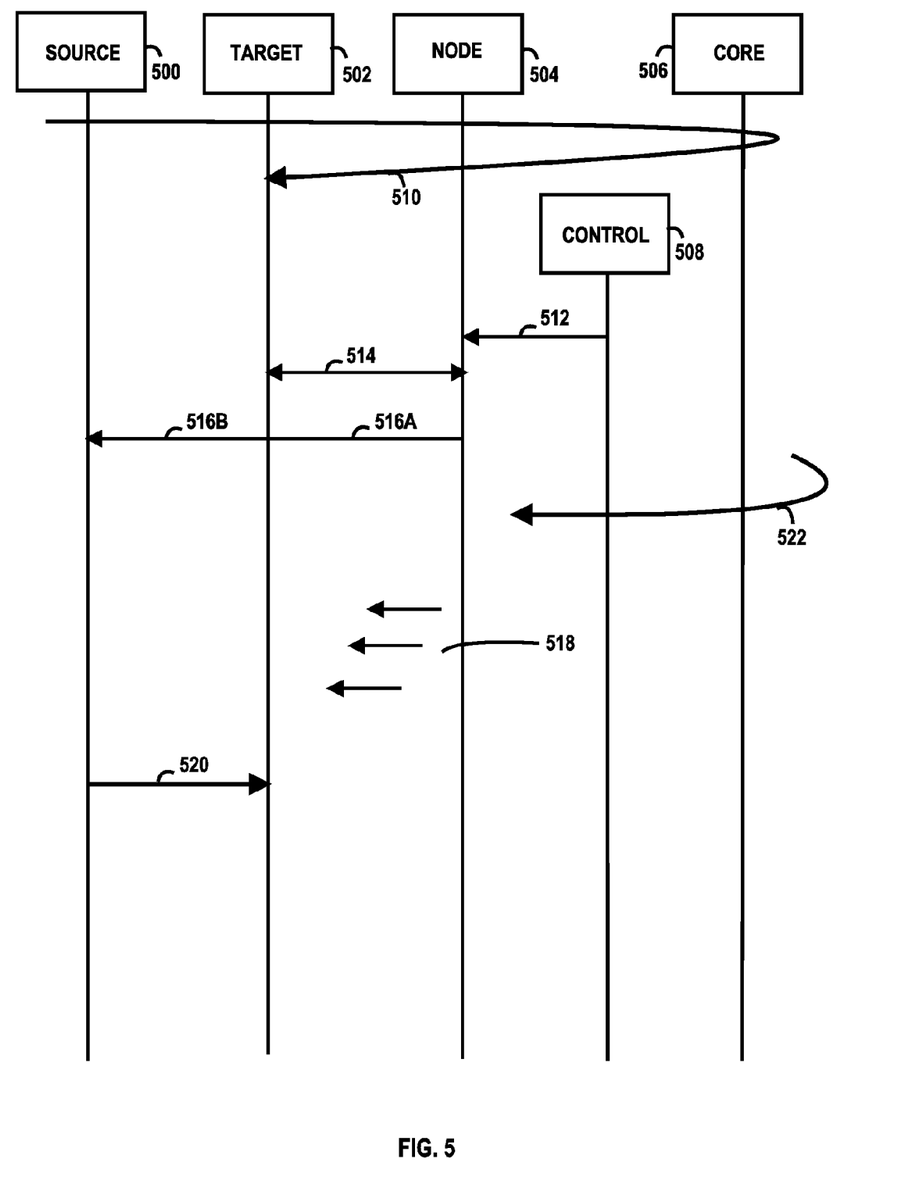
FIG. 5 shows an example of mode switching.
Figure 6:
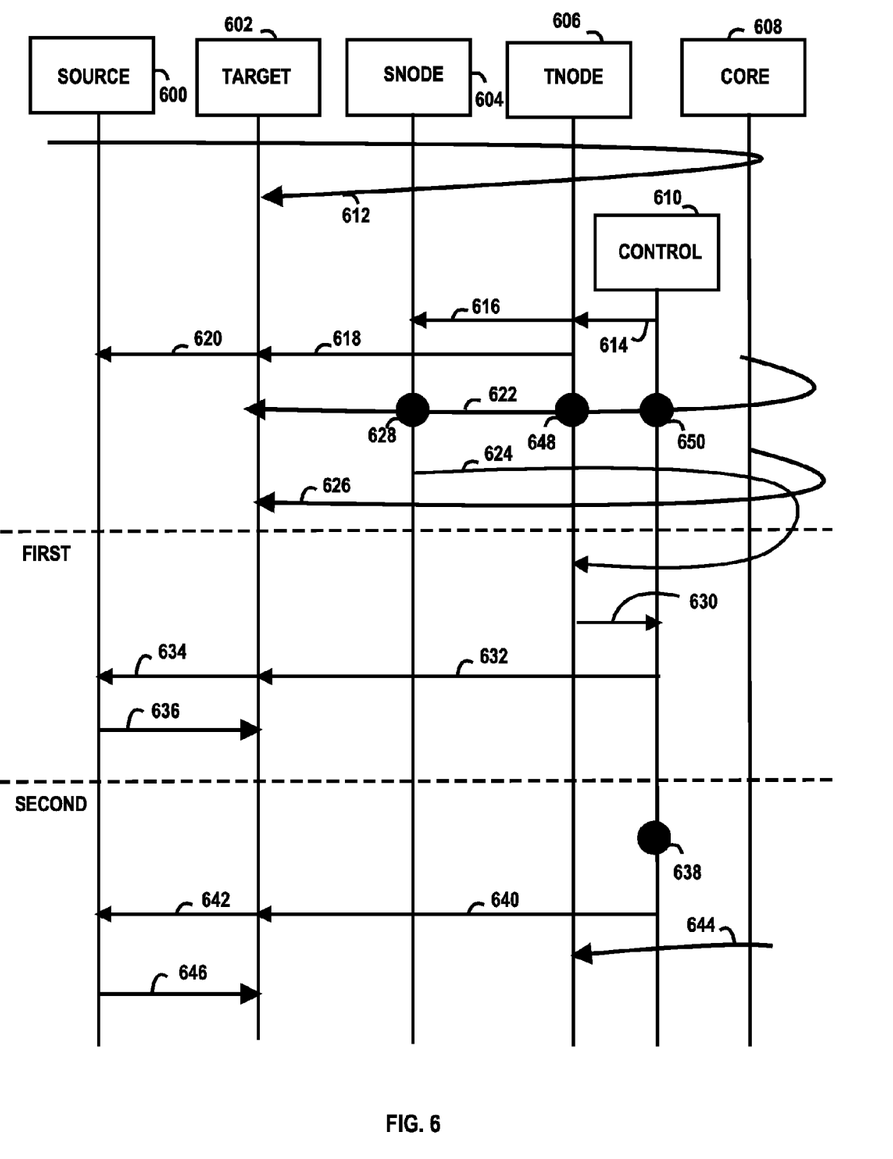
FIG. 6 shows another example of mode switching.

Some embodiments are further clarified by means of the following examples and FIGS. 5 and 6. The FIGS. 5 and 6 illustrate simplified examples used herein only for clarification purposes. They do not limit practical implementations of embodiments by any means. It is obvious for a skilled person that more or less devices and communication connections may be present in a network.

The steps/points, signaling messages and related functions described above in FIGS. 2, 3, 4, 5 and 6 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

It should be understood that transmitting and/or receiving may herein mean preparing a transmission and/or reception, preparing a message to be transmitted and/or received, or physical transmission and/or reception itself, etc on a case by case basis. Sending may mean any kind of data conveyance by using a wired or wireless link as well as preparation of data conveyance. Additionally, conveying information may mean initiation of a message or a part of a message, or physical conveying, such as transmission, etc. depending on current application.

FIG. 5 depicts an example of using a temporary radio bearer. Any one of the node apparatuses in the example of FIG. 1 may be a node serving a data source device and/or a data target device. Any one of the user devices in the same example may be the data source device or the data target device.

In the example of FIG. 5, a data source device 500 sends a data flow which is shown by an arrow 510. The data flow goes via a core network 506. A control node 508 initiates switching to a D2D or M2M communication or operation mode by a message 512. The message also informs a transition period. The transition period may be controlled by a timer. The message is conveyed to a Node B 504. The Node B setups a temporary radio bearer 514 and informs it to a data target device 502. Information on transition period is conveyed also to a data target device 502 and a data source device 500 (arrows 516A and 516B).

The data source device terminates transmitting data which is going to be transferred to be transmitted in a D2D or M2M mode.

The Node B 504 extracts data packets from data flow 522, maps the extracted data packets onto the temporary radio bearer and sets a PDCP SN to a corresponding 7 or 12 bit version of IP identification field, and adds control information and/or a new PDCP field to indicate how much a data target device has to advance the SN of its PDCP. The Node B conveys PDCP packets carrying a data flow with the modified SN and/or other control information (arrow 518). The data source device discovers or it is informed that a transition period ends and it continues data transmission (arrow 520). The transition period may be controlled by a timer in such a manner that Node B 504 starts a corresponding timer than the control node and it informs the data source device about the timer expiration.

Upon the timer expiration or D2D (M2M) mode activation before the expiration, the node serving the data target device (eNodeB 504) may terminate the temporary radio bearer or the "normal" bearer of the data flow.

FIG. 6 depicts an example of the using of dummy or empty packets. A data source device 600 sends a data flow which is shown by an arrow 612. The data flow goes via a core network 608.

In the example of FIG. 6, a control node 610 initiates switching to a D2D or M2M communication or operation mode by a message (arrows 614 and 616). The message also triggers and informs a transition period. The message is conveyed to a Node B serving a data source device 604 and a Node B serving a data target device 606.

The Node Bs may inform the data source device and the data target device about preparations for switching to D2D mode (arrows 618 and 620).

The control node 610 starts a transition period timer for controlling the duration of a transition period. The control node informs the starting of the timer to the node serving the data source device (650) and the node serving the data target device, which both may also start corresponding timers (628, 648). The timers are triggered by sending and/or receiving signaling messages for controlling or guarding the operation of the transition period (the arrows 614, 616)

The data source device then stops sending data packets until the mode transfer has been carried out.

Two options for using dummy or empty packets for marking the beginning of a transition period exist.

In one option (marked as "first" in the Figure), D2D or M2M mode is active before the timers are expired. Arrow 622 depicts the continuity of data flow.

The Node B serving the data source device generates at least one dummy or empty packet which is used as a mark for the beginning of the transition period, and conveys the at least one or empty packets to the Node B serving the data target device (arrow 624). The Node B serving the data target device 606 informs the control node 610 about receiving the at least one or empty packet. Data flow continues (arrow 626).

The Node B serving the data target device informs the control node on reception of the dummy packets (arrow 630).

The control node starts the synchronization of a data flow in the D2D or M2M mode. It starts the modification of the PDCP sequence number (SN) as well. The modification is based on the current sequence number used by the data source device. Information on the synchronization and the modified PDCP SN number is conveyed to both the data source device 600 and the data target device 602 (arrows 632 and 634). The signal is conveyed at least via the new serving (e)NodeB or the conveyance may be carried out by it.

The data source device sends data packets carrying the modified sequence number thus continuing data conveyance now in the D2D or M2M mode (arrow 636). The PDCP SN may also start from 0.

In another option (marked as "second" in the Figure), the D2D or M2M mode is active only after timer expiration (point 638).

The control node starts the switching to D2D or M2M operation or communication mode and resets the PDCP. This information is conveyed to both the data source device 600 and the data target device 602 (arrows 640 and 642). The information signal is conveyed at least via the new serving (e)NodeB or the conveyance may be carried out by it. In one option, a higher layer or PDCP data synchronization is now carrier out after the mode change. This is called herein post-D2D (or M2M) data synchronization. It is carrier out between the data source device and the data target device. The procedure may include anupper-layer sent-received data synchronization between the devices over a D2D (M2M) link. The procedure may be implemented by using one or more PDCP C-PDU messages on the user plane or a new control plane procedure of a radio resource control protocol, for example.

The conveyance of dummy packets continues (arrow 644).

In another option, the data source device continues data transmission right away from the sequence number next in the line as if transmission were in the E2E mode, if possible data packet losses are tolerable (for example in real time services). The data source device continues conveyance of data packets with a reset sequence number (arrow 646). The PDCP SN may also start from 0.

In either of the option explained above, the PDCP SN may be set or reset for a D2D or M2M link after data synchronization is carried out.

The procedure for misinterpretation of a sequence number explained above may also be applied to this example.

Figure 7:
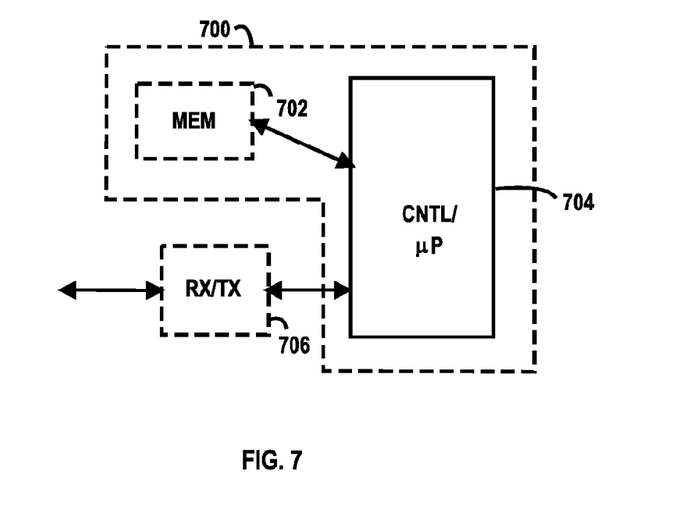
FIG. 7 illustrates an example of an apparatus.

An embodiment provides an apparatus which may be any node, host, user device or any other suitable apparatus able to carry out processes described above in relation to FIGS. 2, 3, 4, 5 and 6. FIG. 7 illustrates a simplified block diagram of an apparatus according to an embodiment. It should be appreciated that the apparatus may also include other units or parts than those depicted in FIG. 7. Although the apparatus has been depicted as one entity, different modules and memory (one or more) may be implemented in one or more physical or logical entities.

The apparatus 700 may in general include at least one processor, controller or a unit designed for carrying out control functions operably coupled to at least one memory unit and to various interfaces. Further, a memory unit may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus.

The apparatus may be a software application, or a module, or a unit configured as arithmetic operation, or as a program (including an added or updated software routine), executed by an operation processor. Programs, also called program products or computer programs, including software routines, applets and macros, can be stored in any apparatus-readable data storage medium and they include program instructions to perform particular tasks. Computer programs may be coded by a programming language, which may be a high-level programming language, such as objective-C, C, C++, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as a single-chip computer element, or as a chipset, including at least a memory for providing storage capacity used for arithmetic operation and an operation processor for executing the arithmetic operation.

As an example of an apparatus according to an embodiment, it is shown an apparatus, such as a node device, including facilities in a control unit 704 (including one or more processors, for example) to carry out functions of embodiments, such as determining transmission ranges of user devices and assigning user device groups. This is depicted in FIG. 7.

The apparatus may also include at least one processor 704 and at least one memory 702 including a computer program code, the at least one memory and the computer program code configured to, with the at least one processor, cause the apparatus at least to: control duration of a transition period for switching to a machine-to-machine communication mode, and control synchronization of data flows during the transition period, or control stopping of sending data and sending of at least one dummy packet, the at least one dummy packet being used for controlling a progress of the switching to the machine-to-machine communication m, and prepare configuration of end-user devices of data sending and receiving sides for switching to the machine-to-machine communication mode.

Another example of an apparatus comprises means 704 for controlling duration of a transition period for switching to a machine-to-machine communication mode, and means 704 for controlling synchronization of data flows during the transition period, or means 704 for controlling stopping of sending data and sending of at least one dummy packet, the at least one dummy packet being used for controlling a progress of the switching to the machine-to-machine communication m, and means 704 for preparing configuration of end-user devices of data sending and receiving sides for switching to the machine-to-machine communication mode.

Yet another example of an apparatus comprises a first controller configured to control duration of a transition period for switching to a machine-to-machine communication mode, and a second controlled configured to control synchronization of data flows during the transition period, and/or a third controller configured to control stopping of sending data and sending of at least one dummy packet, the at least one dummy packet being used for controlling a progress of the switching to the machine-to-machine communication, and a preparation unit configured to prepare configuration of end-user devices of data sending and receiving sides for switching to the machine-to-machine communication mode.

The apparatus may also include at least one processor 704 and at least one memory 702 including a computer program code, the at least one memory and the computer program code configured to, with the at least one processor, cause the apparatus at least to: stop sending data, and generate at least one dummy packet and initiate sending of the at least one dummy packet for controlling a progress of switching to a machine-to-machine communication mode. Another example of an apparatus comprises means 704 stopping sending data, and means 704 for generating at least one dummy packet and initiate sending of it for controlling a progress of switching to a machine-to-machine communication mode.

Yet another example of an apparatus comprises a sending unit configured to stop sending data, and a generator configured to generate at least one dummy packet and initiate sending of the at least one dummy packet for controlling a progress of switching to a machine-to-machine communication mode.

The apparatus may also include at least one processor 704 and at least one memory 702 including a computer program code, the at least one memory and the computer program code configured to, with the at least one processor, cause the apparatus at least to: in the case of a plurality of data flows being mapped or multiplexed on a bearer: extract a desired data flow from the bearer, map the desired data flow on a temporary bearer for transmission, and add control information to the temporary bearer for transmission during a transition period for switching to a machine-to-machine communication mode, or in the case of at least one dummy packet is being used for controlling a progress of switching to a machine-to-machine communication mode: terminate conveyance of the at least one dummy packet by reporting receiving of the at least one dummy packet.

Another example of an apparatus comprises means 704 for (in the case of a plurality of data flows being mapped or multiplexed on a bearer) extracting a desired data flow from the bearer, means 704 for mapping the desired data flow on a temporary bearer for transmission, and means 704 for adding control information to the temporary bearer for transmission during a transition period for switching to a machine-to-machine communication mode, or means 704 for (in the case of at least one dummy packet is being used for controlling a progress of switching to a machine-to-machine communication mode) terminating conveyance of the at least one dummy packet by reporting receiving of the at least one dummy packet.

Yet another example of an apparatus comprises a an extractor configured to extract a desired data flow from the bearer, a mapper configured to map the desired data flow on a temporary bearer for transmission, and adder configured to add control information to the temporary bearer for transmission during a transition period for switching to a machine-to-machine communication mode, and/or a terminating unit configured to terminate conveyance of the at least one dummy packet by reporting receiving of the at least one dummy packet.

Embodiments of FIGS. 2, 3, 4, 5 and 6 may be carried out in a processor or control unit 704 possibly with aid of memory 702.

It should be appreciated that different units may be implemented as one module, unit, processor, etc., or as a combination of several modules, units, processor, etc.

It should be understood that the apparatuses may include other units or modules etc. used in or for transmission. However, they are irrelevant to the embodiments and therefore they need not to be discussed in more detail herein. Transmitting may herein mean transmitting via antennas to a radio path, carrying out preparations for physical transmissions or transmission control depending on the implementation, etc. The apparatus may utilize a transmitter and/or receiver which are not included in the apparatus itself, such as a processor, but are available to it, being operably coupled to the apparatus. This is depicted as an option in FIG. 7 as a transceiver 706. Embodiments provide computer programs embodied on a distribution medium, comprising program instructions which, when loaded into electronic apparatuses, constitute the apparatuses as explained above.

Other embodiments provide computer programs embodied on a computer readable medium, configured to control a processor to perform embodiments of the methods described above. The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
   at least one processor; and
   at least one memory including a computer program code, the at least one memory and the computer program code configured to, with the at least one processor, cause the apparatus to:
   control duration of a transition period for switching to a machine-to-machine communication mode;
   control synchronization of data flows during the transition period;
   control stopping of sending data and sending of at least one dummy packet, the at least one dummy packet being used for controlling a progress of the switching to the machine-to-machine communication mode; and prepare configuration of end-user devices of data sending and receiving sides for switching to the machine-to-machine communication mode.

2. The apparatus of claim 1, wherein the duration of a transition period for switching to a machine-to-machine communication mode is controlled by using a timer.

3. The apparatus of claim 2, wherein if the transition period timer expires without a report of succeeded data transfer, a post data synchronization is invoked after switching to the machine-to-machine communication mode.

4. The apparatus of claim 1, wherein data is packet data and identified with a packet data convergence protocol sequence number.

5. The apparatus of claim 4, wherein in switching to the machine-to-machine communication mode, the packet data convergence protocol sequence number is modified or reset.

6. The apparatus of claim 1, wherein a control field is added to a first data unit sent on a temporary radio bearer and with a modified sequence number.

7. The apparatus of claim 1, wherein after the switching to the machine-to-machine communication mode, a first data packet comprises information on it to be the first data packet after transmission via a cellular bearer has been terminated.

8. The apparatus of claim 1, the apparatus comprising a node device or network control device.

9. An apparatus comprising:
at least one processor; and
at least one memory including a computer program code, the at least one memory and the computer program code configured to, with the at least one processor, cause the apparatus to:
in case of a plurality of data flows being mapped or multiplexed on a bearer, extract a desired data flow from the bearer;
map the desired data flow on a temporary bearer for transmission; and
add control information to the temporary bearer for transmission during a transition period for switching to a machine-to-machine communication mode;
in case of at least one dummy packet being used for controlling a progress of switching to the machine-to-machine communication mode, terminate conveyance of the at least one dummy packet by reporting receiving of the at least one dummy packet.

10. A method comprising:
controlling duration of a transition period for switching to a machine-to-machine communication mode; and
controlling synchronization of data flows during the transition period;
controlling stopping of sending data and sending of at least one dummy packet, the at least one dummy packet being used for controlling a progress of the switching to the machine-to-machine communication mode; and
preparing configuration of end-user devices of data sending and receiving sides for switching to the machine-to-machine communication mode.

11. The method of claim 10, wherein the duration of a transition period for switching to the machine-to-machine communication mode is controlled by using a timer.

12. The method of claim 11, wherein if the transition period timer expires without a report of succeeded data transfer, a post data synchronization is invoked after switching to the machine-to-machine communication mode.

13. The method of claim 10, wherein data is packet data and identified with a packet data convergence protocol sequence number.

14. The method of claim 13, wherein in switching to the machine-to-machine communication mode, the packet data convergence protocol sequence number is modified or reset.

15. The method of claim 10, wherein a control field is added to a first data unit sent on a temporary radio bearer and with a modified sequence number.

16. The method of claim 10, wherein after the switching to the machine-to-machine communication mode, a first data packet comprises information on it to be the first data packet after transmission via a cellular bearer has been terminated.

17. A computer program product embodied on a non-transitory computer-readable storage medium, the computer program product comprising program code for controlling a processor to execute a process, the process comprising:
controlling duration of a transition period for switching to a machine-to-machine communication mode;
controlling synchronization of data flows during the transition period;
controlling stopping of sending data and sending of at least one dummy packet, the at least one dummy packet being used for controlling a progress of the switching to the machine-to-machine communication mode; and
preparing configuration of end-user devices of data sending and receiving sides for switching to the machine-to-machine communication mode.

* * * * *